United States Patent Office 2,995,601
Patented Aug. 8, 1961

2,995,601
PROCESS OF PRODUCING L-LYSINE
Hugo Stange, Arthur F. Ferris, and Francis E. Gould, Princeton, N.J., assignors to Food Machinery and Chemical Corporation, New York, N.Y., a corporation of Delaware
No Drawing. Filed Feb. 9, 1960, Ser. No. 7,517
6 Claims. (Cl. 260—534)

This invention relates to the production of L-lysine, an essential amino acid important in both animal and human nutrition. More particularly, this invention relates to processes of synthesizing this amino acid by converting alkyl or aralkyl 5-cyano-2-oximinovaleric acid esters to 2-oximinoadipic acid, and then converting this dicarboxylic acid to L-lysine.

Syntheses are known for the production of alkyl and aralkyl 5-cyano-2-oximinovaleric acid esters. For example, cyclohexanone reacts with alkyl nitrites in the presence of hydrochloric acid to form the cyclic dioximino ketone which, when subjected to a Bechmann type cleavage in ethyl alcohol, produces ethyl 5-cyano-2-oximinovalerate. Cleavage in other alcohols gives the corresponding ester, e.g., in methyl alcohol methyl 5-cyano-2-oximinovalerate is obtained, and in benzyl alcohol benzyl 5-cyano-2-oximinovalerate is obtained.

Attempts heretofore made to hydrolyze alkyl or aralkyl 5-cyano-2-oximinovalerates to produce 2-oximinoadipic acid have proven unsuccessful. The use of an alcohol base such, for example, as a mixture of ethyl alcohol and sodium hydroxide as disclosed in W. Dieckmann, Ber., 33, 579 (1900) for the hydrolysis of the diethyl ester of 2-oximinoadipic acid, gives only partial hydrolysis of ethyl 5-cyano-2-oximinovalerate. Hydrolysis of ethyl 5-cyano-2-oximinovalerate with cold aqueous hydrochloric acid gives an ill defined product consisting of a mixture of 2-oximinoadipic acid, 2-oxoadipic acids, glutaric acid, and various other materials. The use of hot aqueous hydrochloric acid results in the production of glutaric acid.

It is among the objects of the present invention to provide a process for producing L-lysine, starting with alkyl or aralkyl 5-cyano-2-oximinovalerates, readily available materials producible, for example, from the commercially available compound cyclohexanone, which process is economically attractive and results in good yields of L-lysine.

It is another object of the present invention to provide a process of hydrolyzing 5-cyano-2-oximinovalerates to produce the intermediate, 2-oximinoadipic acid.

Other objects and advantages of the present invention will be apparent from the following detailed description thereof.

In accordance with this invention, 5-cyano-2-oximinovaleric esters having the formula:

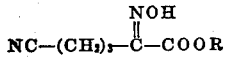

in which R is alkyl, preferably alkyl having from 1 to 8 carbon atoms, or aralkyl, preferably benzyl, are subjected to hydrolysis by heating with an aqueous alkali metal hydroxide in amount of at least 2, and preferably at least 3, mols of alkali metal hydroxide per mol of oximino compound to a temperature within the range of from about 50° C. to the boiling point of the reaction mixture. The alkali metal salt of the 2-oximinoadipic acid thus produced is acidified to form the 2-oximinoadipic acid, and the latter material is subjected to treatment with yeast enzymes to produce the desired amino acid. Surprisingly, hydrolysis under the conditions above noted takes place smoothly, the 2-oximinoadipic acid is produced in high yields, and this organic acid is converted by the yeast enzymes to the desired amino acid.

The hydrolysis procedure of the present invention, it will be appreciated, is useful as such to produce the intermediate 2-oximinoadipic acid. Hence it constitutes an important step of the present invention, having utility in and of itself. In other words, the invention is not limited to the conduct of the hydrolysis, the recovery of the 2-oximinoadipic acid from the hydrolysis reaction mixture and the yeast fermentation of the 2-oximinoadipic acid to produce L-lysine, but includes the novel hydrolysis procedure as a separate treatment which can be used to produce 2-oximinoadipic acid.

The 5-cyano-2-oximinovaleric acid ester subjected to hydrolysis may be an alkyl or aralkyl 5-cyano-2-oximinovaleric acid ester. The alkyl or aralkyl substituent does not enter into the reaction but is simply split off during the course of the reaction. Hence, the particular alkyl or aralkyl substituent utilized is not critical. For reasons of economy, methyl, ethyl or benzyl is preferable.

Of the alkali metal hydroxides, sodium and potassium hydroxides are preferred; since sodium hydroxide is less expensive, it is particularly preferred. The amount of alkali metal hydroxide added to the reaction mixture should be at least 2 and preferably at least 3 mols of alkali metal hydroxide per mol of the 5-cyano-2-oximino-valeric acid ester. By employing at least 2 mols of alkali metal hydroxide per mol of oximino compound, enough metal hydroxide is present to hydrolyze both terminal carbon atoms. As indicated, the amount of hydroxide should be in excess of 2 mols and preferably in excess of 3 mols of alkali metal hydroxide per mol of oximino compound; the amount of excess is not critical, but the greater the quantity used, the more acid will be required to neutralize the reaction mixture. An excess of the order of about 10% above 3 mols of alkali metal hydroxide per mol of oximino compound gives good results.

The amount of water in the reaction mixture during the hydrolysis should be at least 3 mols of water per mol of oximino compound and enough over and above this amount to have the reaction mixture in a mobile condition. The excess of water used over and above the 3 mols does not deleteriously affect the reaction except that the use of large excesses should be avoided to eliminate unecessary handling problems and the waste involved in heating the excess water.

The reaction is preferably carried out under atmospheric pressure conditions. Superatmospheric pressure conditions can be used provided provision is made to vent the ammonia liberated during the course of the reaction. The use of superatmospheric pressure conditions tends to accelerate the rate of reaction and hence shortens the time required for the reaction to go to completion.

The alkali metal salts of the 2-oximinoadipic acid thus produced can be readily acidified, desirably with a mineral acid such as sulfuric acid, to convert them to the free acid. The free acid can be recovered from the reaction mixture in any desired manner, for example, by extraction with a solvent such as ether, and then evaporating the solvent to obtain the pure dicarboxylic acid.

For the production of an amino acid by yeast fermentation, the acidified reaction mixture containing the 2-oximinoadipic acid can be treated with alkali to adjust the pH to that desired for the fermentation procedure and then subjected to fermentation, or the 2-oximinoadipic acid can be isolated from the acidified reaction mixture and subjected to yeast fermentation.

In carrying out the fermentation, the 2-oximinoadipic acid is mixed with a broth or basal medium containing the desired nutrients commonly employed in yeast fermentation to produce a mixture having a concentration of from about 1% to 5% by weight, preferably about 2%, of the oximinoadipic acid, the pH adjusted to from 3 to 7, preferably 4 to 6, the mixture sterilized, the yeast cells added, and the fermentation permitted to proceed, preferably while agitating, until a satisfactory yield of the L-lysine has been produced. The fermentation is then stopped, for example, by steaming to rupture the yeast cells and liberate their lysine content. The entire fermentation liquid thus produced may be utilized. For example, it may be dried, pelleted, and employed as an additive for animal or human nutrition. Alternatively, the L-lysine may be recovered in pure or almost pure condition.

The fermentation is preferably conducted under atmospheric or ambient temperature conditions; if desired, however, the broth or basal medium may be heated to a temperature not exceeding about 50° C. Hence, the temperature conditions employed will vary within the range of from about 15° C. to 50° C. The time during which the fermentation is permitted to proceed will depend upon the particular yeast employed, the temperature conditions, the nutrients present in the basal medium, the degree of agitation and/or aeration, etc. In general, appreciable yields are obtained after a few hours, and after three days or longer the yields of L-lysine are adequate for recovery.

As the yeast employed any of the known cultures may be used such, for example, as baker's yeast (*Saccharomyces cerevisiae*) or other known yeasts of the family of Endomycetaceae, Cryptococcaceae, and *Torulopsis utilis*. The broth or basal medium employed may contain known nutrients such as dextrose, corn steep liquors, molasses, malt extracts, etc. A suitable broth is one containing dextrose and corn steep liquor in equal proportions, also containing a small amount of ammonium sulfate and having a pH between 5 and 6 produced, for example, by adding phosphoric acid to the basal medium. Another suitable medium contains in approximately equal amounts molasses and malt extract and about 95% by weight of water.

The following examples are given for the purpose of illustrating the invention; it will be appreciated that the invention is not limited to these examples. Examples I to III, inclusive, involve the novel hydrolysis procedure of the present invention.

EXAMPLE I

*2-oximinoadipic acid from ethyl 5-cyano-2-oximinovalerate*

A mixture of 18.4 grams (0.10 mol) of ethyl 5-cyano-2-oximinovalerate and 80 ml. of 35% aqueous sodium hydroxide solution was heated under reflux for five hours. Ammonia was evolved vigorously during the early part of the heating period, but appeared to have ceased coming off at the end of five hours. The resulting homogeneous solution was cooled to 25° C. and 90 ml. of water was added. This solution was then made acid by the gradual addition of 130 ml. of 50% sulfuric acid, the temperature being held at 25–35° C. by external cooling. The solution was then saturated with solid ammonium sulfate and was extracted for 16 hours with ether in a continuous liquid-liquid extraction apparatus. The ether solution was dried over anhydrous magnesium sulfate, then evaporated under reduced pressure to give 16.0 grams (91%) of slightly brownish 2-oximinoadipic acid, melting point 148–150° C.

A portion of this material was recrystallized from water at 60° C. (2 ml. per gram) to give pure white 2-oximinoadipic acid, melting point 151° C., in about 60% recovery. The purified material was then anaylzed and the combustion analysis of carbon, 41.20; hydrogen, 5.31; nitrogen, 7.78; corresponded closely to the calculated carbon, 41.15; hydrogen, 5.18; and nitrogen, 8.0.

EXAMPLE II

*2-oximinoadipic acid from methyl 5-cyano-2-oximinovalerate*

A mixture of 17.0 grams (0.10 mol) of methyl 5-cyano-2-oximinovalerate was treated with 100 ml. of 25% potassium hydroxide solution as described in Example I. There was obtained 15.7 grams (90%) of brownish 2-oximinoadipic acid, M.P. 147–149° C. Recrystallization from water raised the melting point to 150–151° C.

EXAMPLE III

*2-oximinoadipic acid from benzyl 5-cyano-2-oximinovalerate*

To a solution of 10.0 grams (0.25 mol) of sodium hydroxide in 40 ml. of water was added 12.3 grams (0.05 mol) of benzyl 5-cyano-2-oximinovalerate. The mixture was heated at 80–90° C. for seven hours with mechanical agitation, ammonia being evolved. It was then cooled to 25° C., 50 ml. of water was added, and it was extracted with three 50-ml. portions of ether to remove the benzyl alcohol formed in the hydrolysis. The aqueous solution from this extraction was made strongly acid with 50% sulfuric acid, the temperature being held at 20–30° C. by external cooling. The solution was saturated with solid ammonium sulfate and was extracted for 24 hours with ether in a liquid-liquid continuous extraction apparatus. The ether solution was dried over anhydrous magnesium sulfate and evaporated to give 15.2 grams (87%) of 2-oximinoadipic acid, M.P. 146–149° C. Recrystallization from water raised the melting point to 150–151° C.

EXAMPLE IV

*L-lysine from 2-oximinoadipic acid*

This example involves the conversion of 2-oximinoadipic acid (prepared as in Examples I, II and III) to L-lysine.

The basal medium contained 5% dextrose, 5% corn steep liquor (50% solids), and 0.38% ammonium sulfate. Its pH was adjusted to 5.3 by the addition of phosphoric acid. Twenty-five ml. of this medium was placed in each of two 125 ml. flasks and to one was added 125 mg. of 2-oximinoadipic acid. After sterilization, the flasks were inoculated with a washed suspension of *Saccharomyces cerevisiae* cells (A.T.T.C. No. 2366) and stoppered with cotton plugs. The flasks were agitated on a rotary shaking machine (120 r.p.m., 1 inch radius) at 28° C. for 72 hours.

Following incubation, the flasks were steamed at 100° C. to rupture the yeast cells and liberate their contents to the medium. The samples were assayed for lysine content according to the microbiological method described by Barton-Wright ("Microbiological Assay of the Vitamin B-Complex and Amino Acids," Pitman Publishing Corp., N.Y., 1952) employing *Leuconostoc mesenteroides* (P-60) as the test organism. The results are given in the table which follows, the values given representing the amount of lysine in milligrams per flask:

TABLE

| Sample: | Lysine content (mg./flask) |
|---|---|
| Basal medium with 2-oximinoadipic acid | 16.0 |
| Control basal medium (contained no oximinoadipic acid) | 1.9 |

It will be noted that the present invention provides a process of producing L-lysine from 5-cyano-2-oximinovalerate esters by hydrolyzing these esters to produce the corresponding 2-oximinoadipic acid and subjecting the latter to yeast fermentation. It will be further noted that the present invention involves a novel process of hydrolyzing alkyl or aralkyl 5-cyano-2-oximinovaleric acid esters to produce 2-oximinoadipic acid.

Since certain changes can be made in carrying out the above described processes without departing from the scope of this invention, it is intended that all matter contained in the above description shall be interpreted as illustrative and not in a limiting sense.

What is claimed is:
1. The process of hydrolyzing an ester having the formula:

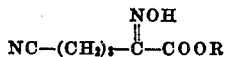

in which R is a member of the group consisting of alkyl and aralkyl, to produce 2-oximinoadipic acid, which process comprises heating a mixture of said ester, water in amount of at least 3 mols of water per mol of said ester and an alkali metal hydroxide in amount of at least 2 mols of said alkali metal hydroxide per mol of said ester, to a temperature within the range of from 50° C. to the boiling point of the reaction mixture to produce a reaction mixture containing the alkali metal salt of 2-oximinoadipic acid, and thereafter acidifying said reaction mixture to form the 2-oximinoadipic acid.

2. The process defined in claim 1, wherein said ester is ethyl 5-cyano-2-oximinovalerate.

3. The process defined in claim 1, wherein said ester is methyl 5-cyano-2-oximinovalerate.

4. The process defined in claim 1, wherein said ester is benzyl 5-cyano-2-oximinovalerate.

5. The process of hydrolyzing an ester having the formula:

in which R is a member of the group consisting of alkyl and aralkyl, to produce 2-oximinoadipic acid, which process comprises heating a mixture of said ester, water in amount of at least 3 mols of water per mol of said ester and sodium hydroxide in amount of at least 3 mols of sodium hydroxide per mol of said ester, to a temperature within the range of from 50° C. to the boiling point of the reaction mixture to produce a reaction mixture containing the sodium salt of 2-oximinoadipic acid, and thereafter acidifying said reaction mixture to form the 2-oximinoadipic acid.

6. The process of hydrolyzing an alkyl 5-cyano-2-oximinovalerate to produce 2-oximinoadipic acid, which comprises heating a mixture of said 2-oximinovalerate with an alkali metal hydroxide and water in amount of at least 2 mols of said alkali metal hydroxide per mol of said oximinovalerate and at least 3 mols of water per mol of oximinovalerate, the amount of water present being sufficient to provide a mobile reaction mixture, at a temperature within the range of from 50° C. to the boiling point of the reaction mixture until said oximinovalerate is converted to the alkali metal salt of 2-oximinoadipic acid, and thereafter acidifying the reaction mixture to convert the said salt of 2-oximinoadipic acid to 2-oximinoadipic acid.

No references cited.